Patented Nov. 27, 1945

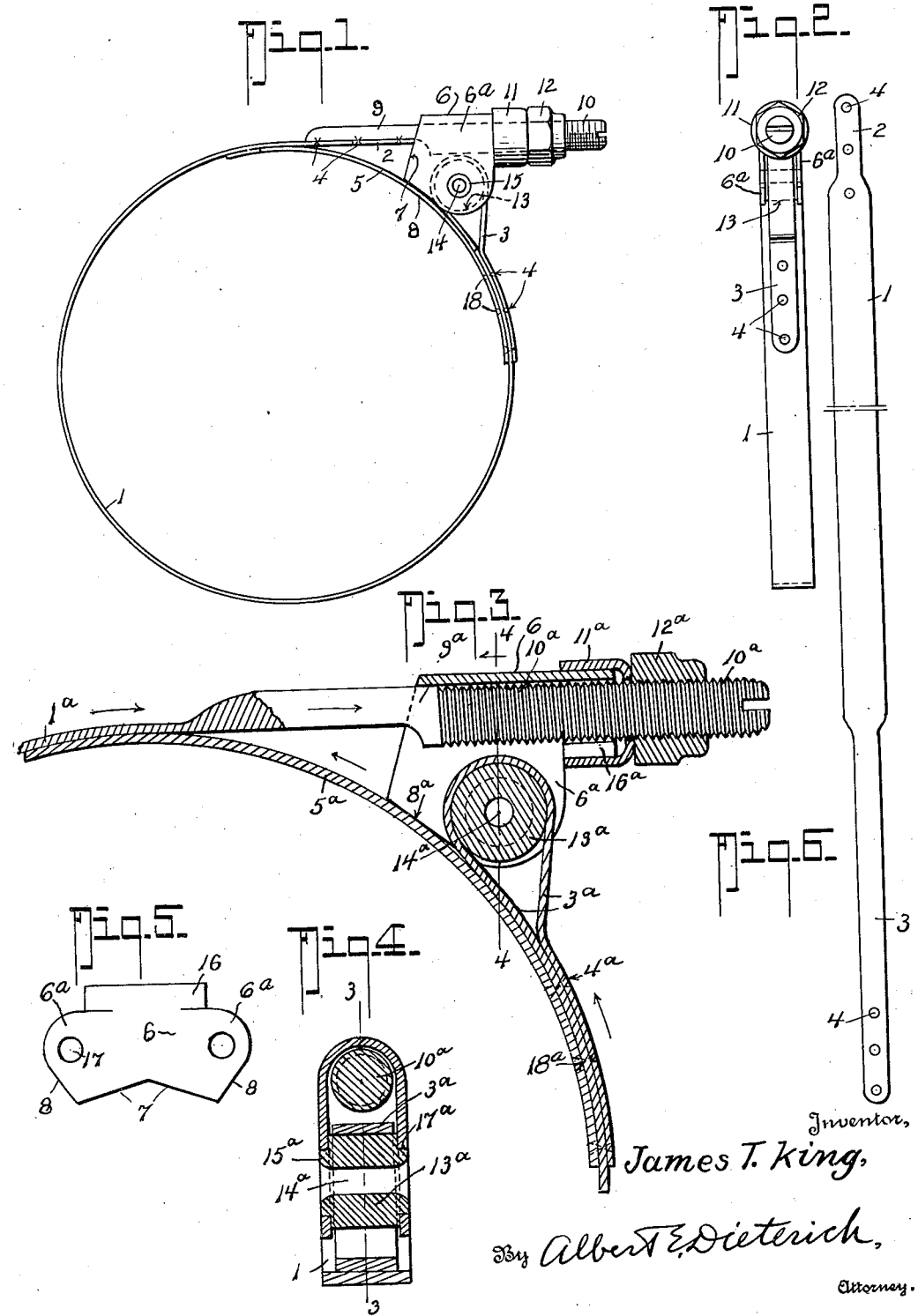

2,389,785

UNITED STATES PATENT OFFICE 2,389,785

HOSE CLAMP

James T. King, Burbank, Calif.

Application March 9, 1944, Serial No. 525,699

8 Claims. (Cl. 24—19)

My invention relates to the art of hose clamps and it particularly has for an object to provide an all purpose clamp that can be used safely to retain metallic packing rings or steel tubing when same may be subjected to temperatures that often exceed 1000° Fahrenheit.

Other objects of the invention are to provide an efficient clamp that is especially adapted for use with all forms of automotive and aircraft engine exhaust systems; a clamp that will act throughout a full circle (360°) with entire area of the clamping band used as the tensioning medium; a clamp of light weight and relatively great strength; a clamp which is corrosion and fire proof; a clamp which can be quickly installed and disconnected; a clamp with an extra wide range of take-up to provide for possible and frequent adjustments; a clamp so constructed that it may be opened up for installation; an all purpose clamp that can be used on fuel, oil, air-duct assemblies or for the external sealing of exhaust system slip joints so that they will remain leak proof and securely tensioned while subjected to the constant stresses of expansion and contraction inherent in gas exhaust systems; a clamp that can be easily installed in places when it is awkward to place and adjust for tension without the aid of any special tools.

Other objects are to provide an all purpose clamp embodying the following characteristics: a one piece construction that can be made and formed from metal strip section, preferably suitable stabilized stainless steel; a clamp with no reverse torque action necessary or required to release tension for the clamp's removal; a clamp that, by virtue of its one-piece construction combined with flexibility, is especially adapted for use on all forms and sizes of rubber diaphragm or hose connections including shapes other than circular, as for example streamline or elliptical shapes; a clamp whose basic design makes it possible to use very narrow strap widths and yet retain its light weight combined with adequate strength.

A still further object is to provide a clamp in which the tensioning medium which connects the clamp's terminals together at installation will never exceed the dimensions of the actual strap width, this uniform dimensional width being a necessary requirement for retaining the braided metallic packing inserted in the recessed grooves on circular or elliptical formed shapes.

Again it is an object to provide a clamp which does not employ or require a prescribed fixed radius at the anchor or floating toggle arrangement while undergoing tension but is positively self-aligning.

Other objects will in part be obvious and in part be pointed out hereinafter.

To the attainment of the aforesaid objects and ends the invention still further resides in the novel construction, combination and arrangement of parts all of which will hereinafter be first described in detail and then be specifically pointed out in the appended claims, reference being had to the accompanying drawing in which:

Fig. 1 is a side elevation of one embodiment of my invention.

Fig. 2 is an elevation of the same looking from right to left in Fig. 1.

Fig. 3 is an enlarged detail central vertical section of a slight modification, taken on the line 3—3 of Fig. 4.

Fig. 4 is a cross-section on the line 4—4 of Fig. 3.

Fig. 5 is a face view of a blank from which the floating anchor member is shaped.

Fig. 6 is a developed view of the strap used in the embodiment of Figs. 1 and 2.

In the drawing in which like numerals and letters of reference indicate like parts in all the figures, 1 is the strap whose ends are necked or reduced in width as at 2 and 3 respectively. The short end 2 is welded, preferably by the projection-welding method, to the swaged end 9 of the threaded bolt 10. By the projection-welding method the area of contact of the part to be welded electrically is dimpled, as at 4, in a punch press operation; the dimples are aligned for position and the electric arc is applied under pressure. The heat is focused to its maximum intensity to the center of the profiled dimple and squashed to form a smooth surface weld. The total area of the weld is thus positively joined by the amalgamation of the metal structure.

5 designates a gap bridging strap section which is also welded to the strap 1 as shown at 18.

The long neck 3 of the strap 1 is passed or looped around the anchor pin 13 and then welded to the strap body 1. The floating anchor member 6 is composed of the stamped metal shape shown in Fig. 5. When bent to final form it is of an inverted U-shaped in cross-section (see Fig. 4), the sides 6a of which have aligned holes 17 into which the necks 15 of the anchor pin fit. When assembled the ends of the neck 15 of the pin are upset as shown in Fig. 4, thus uniting the pin 13 and sides of the floating anchor 6 into an integral structure. The floating anchor member 6 has straight edges 8 to lie in contact with the the bridging strip 5 and it also has a bevelled edge 7, and a collar 16 (see Fig. 5 and 16a, Fig. 3) over which collar a cap 11 is securely forced to fit with retaining friction. This metal cap is a press fit and forms a compression base for the tensioned retaining nut. It also locks and stiffens the U-shaped toggle or floating anchor assembly and requires no welding to accomplish this purpose. Under tension the metal capped toggle is adequately re-inforced for a compression base by its doubled thickness and increased strength. The cap has an opening through which the bolt 10 projects and on the projected portion of the bolt, a nut 12 is placed. The pin 13 has a bore to facilitate swaging or upsetting the ends of the neck 15.

When the clamp is applied to an article and nut 12 tightened up, the floating anchor 6 will bear on the edge 8 near where the edges 7 and 8 meet, and effect a pull on the bands 1 and 5 in the direction of the arrows in Fig. 3, thereby causing an even contraction through the entire circle as will be clear to those skilled in the art.

The embodiment shown in Fig. 3 differs from that shown in Fig. 1 only in that in Fig. 1 the strap is shown welded to the bolt while in Fig. 3 it is shown integral with the bolt. Those parts in Fig. 4 which correspond to like parts in Fig. 1 bear the same reference letters plus the index letter *a* and need not be further described. My invention by its special design and arrangement of parts now makes it possible to fabricate clamps embodying very narrow dimensional strap widths; this constitutes an important and exclusive feature in its construction. It will be found impossible to simulate the qualification for narrow strap widths in any other and existing hose clamps. Additional and favorable characteristics of this all purpose clamp are the features for wrap-around assembly and followed by the 360 degree circumferential fit of all strap contact areas; also it is plainly apparent that the simple medium and method employed to apply the required tension, closely follows and simulates, in suitable metal form, the method and process of tying two ends of a string together.

From the foregoing it will be seen that I have provided a clamp which, so far as I know is the only clamp that can be fabricated for narrow dimensional strap widths. Its construction is such that it can withstand temperatures varying from 1000° to 1500° Fahrenheit; the form of the member 6 and its resting on the strap 5 only along the edges 3 provides for considerable radiation of the terminal connections. It may be threaded through a rubber or metallic suitably beaded section to act in the manner of a positively tensioned draw-string arrangement. As before intimated the relatively small contact area presented by the floating anchor member 6 to an incandescent or heated surface is especially effective in the radiation of residual heat.

Other advantages will be apparent to those skilled in the art.

What I claim is:

1. A hose clamp comprising: a flexible strap having end portions of reduced width; a threaded bolt secured to one of said end portions as an extension of the strap; a floating anchor including a member of substantially U-shape in cross-section, through which said bolt passes, and an anchoring pin secured in said U-shaped member and about which pin the other reduced end portion of the strap is freely looped, said other end being secured to the strap proper; and a nut on said bolt and engaging said U-shaped member.

2. A hose clamp comprising: a flexible strap having end portions of reduced width; a threaded bolt secured to one of said end portions as an extension of the strap; a floating anchor including a member of substantially U-shape in cross-section, through which said bolt passes, and an anchoring pin secured in said U-shaped member and about which pin the other reduced end portion of the strap is freely looped, said other end being secured to the strap proper; and a nut on said bolt and engaging said U-shaped member; and a bridging strap having one of its ends secured to said flexible strap to bridge the gap between the ends thereof, said U-shaped member resting on said bridging strap when the clamp is in use.

3. A hose clamp comprising: a flexible strap having end portions of reduced width; a threaded bolt secured to one of said end portions as an extension of the strap, the diameter of said bolt approximately the width of said end portions; a floating anchor including a member of substantially U-shape in cross-section, through which said bolt passes, and an anchoring pin secured in said U-shaped member and about which pin the other reduced end portion of the strap is freely looped, said other end being secured to the strap proper; and a nut on said bolt and engaging said U-shaped member.

4. A hose clamp comprising: a flexible strap having end portions of reduced width; a threaded bolt secured to one of said end portions as an extension of the strap; a floating anchor including a member of substantially U-shape in cross-section, through which said bolt passes, and an anchoring pin secured in said U-shaped member and about which pin the other reduced end portion of the strap is looped, said other end being secured to the strap proper, said U-shaped member being of a width approximately the width of said strap; and a nut on said bolt and engaging said U-shaped member.

5. A hose clamp comprising: a flexible strap having end portions of reduced width; a threaded bolt secured to one of said end portions as an extension of the strap, the diameter of said bolt approximately the width of said end portions; a floating anchor including a member of substantially U-shape in cross-section, through which said bolt passes, and an anchoring pin secured in said U-shaped member and about which pin the other reduced end portion of the strap is freely looped, said other end being secured to the strap proper, said U-shaped member being of a width substantially the same as the width of said strap; and a nut on said bolt and engaging said U-shaped member.

6. A hose clamp comprising: a flexible strap having end portions of reduced width; a threaded bolt secured to one of said end portions as an extension of the strap; a floating anchor including a member of substantially U-shape in cross-section, through which said bolt passes, and an anchoring pin secured in said U-shaped member and about which pin the other reduced end portion of the strap is freely looped, said other end being secured to the strap proper; and a nut on said bolt and engaging said U-shaped member, said U-shaped member having a collar, and a cap tightly fitted over said collar, against which cap said nut engages.

7. A hose clamp comprising: a flexible band having necks at its ends; a threaded bolt constituting an extension of one of said ends; a floating anchor member through which said bolt passes; a bridging strap secured to said flexible strap to bridge the gap between the ends of said flexible strap, said floating anchor member having a straight edge portion to engage said bridging strap; an anchoring pin secured in said floating anchor member, about which pin the other end of said flexible band is freely looped; a nut on said bolt engaging said floating anchor, the place where said nut engages said floating anchor member and the axis of said pin both lying to one and the same side of said floating anchor member remote from the place where said straight edge contacts said bridging strap.

8. In a hose clamp wherein a flexible strap is contractable about the hose-to-be-clamped and in which a threaded bolt constitutes an extension from one end of said flexible strap and in which the bolt carries a nut, the improvement which includes: a floating anchor member through which said bolt freely passes and against which said nut engages; a bridging strap secured to said flexible strap for bridging the gap between the ends of said flexible strap; an anchoring pin secured in said floating anchor member about which pin the other end of said flexible strap is freely looped, said floating anchor member engaging said bridging strap at one place and the place where said nut engages said floating member and the place where the axis of said pin is located being at the same side of the place where said floating member engages said bridging strap.

JAMES T. KING.